United States Patent

Fujinami

Patent Number: 5,500,040
Date of Patent: Mar. 19, 1996

[54] ULTRAVIOLET-CURABLE THERMOCHROMIC INK COMPOSITION

[75] Inventor: Fumiko Fujinami, Daito, Japan

[73] Assignee: Sakura Color Products Corporation, Osaka, Japan

[21] Appl. No.: 445,940

[22] Filed: May 22, 1995

[30] Foreign Application Priority Data

May 31, 1994 [JP] Japan .................. 6-118245

[51] Int. Cl.⁶ .................................................. C09D 11/02
[52] U.S. Cl. .................. 106/21 A; 106/21 R; 106/21 D
[58] Field of Search ......................... 106/21 R, 21 A, 106/21 D

[56] References Cited

U.S. PATENT DOCUMENTS

| | | | |
|---|---|---|---|
| 5,350,633 | 9/1994 | Sumii et al. | 106/21 R |
| 5,350,634 | 9/1994 | Sumii et al. | 106/21 R |

*Primary Examiner*—Helene Klemanski
*Attorney, Agent, or Firm*—Larson and Taylor

[57] ABSTRACT

An ultraviolet-curable thermochromic ink composition comprising thermochromic microcapsules and a photo-polymerizable composition as basic components, wherein said thermochromic microcapsule comprises at least one ultraviolet absorber having an absorption wave range of at least about 220–380 nm, and said photo-polymerizable composition comprises at least one photo-initiator having an absorption wave range of at least about 360–450 nm.

3 Claims, No Drawings

ULTRAVIOLET-CURABLE THERMOCHROMIC INK COMPOSITION

TECHNICAL FIELD

The present invention relates to an ultraviolet-curable thermochromic ink composition.

In the specification, "part" means "part by weight".

BACKGROUND ART

A thermochromic material consisting of electron-donating and coloring organic compounds, electron-accepting compounds and desensitizers and a thermochromic material formed by encapsulating such components are known (see, Japanese Examined Patent Publication No. 14270/1989). Leuco dye employed in said thermochromic material is very inferior in resistance to light so that ultraviolet absorber is usually blended with the thermochromic material. When an ultraviolet-curable thermochromic ink composition is prepared by blending said thermochromic material with a photopolymerizable resin composition, a problem of undercure of an ink applied to printed face arises.

Said ultraviolet absorber prevents deterioration of leuco dye caused by light, only when the ultraviolet absorber has an absorption wave range of 220–380 nm. Resistance to light of thermochromic material is not improved by using an ultraviolet absorber having a longer absorption wave range (e.g. 380–450 nm).

It is a primary object of the present invention to provide a thermochromic ink composition comprising ultraviolet absorber suitable for leuco dye, wherein the composition is free of undercure of the ink and excellent in resistance to light and curing characteristics.

DISCLOSURE OF THE INVENTION

The inventors conducted extensive research in considering problems of the prior art and found that said object is accomplished by encapsulating ultraviolet absorber having a specific absorption wave range and adding photo-initiator having a specific absorption wave range.

Thus, the invention provides an ultraviolet-curable thermochromic ink composition shown below.

An ultraviolet-curable thermochromic ink composition comprising thermochromic microcapsules and a photo-polymerizable composition as basic components, wherein said thermochromic microcapsule comprises at least one ultraviolet absorber having an absorption wave range of at least about 220–380 nm, and said photo-polymerizable composition comprises at least one photo-initiator having an absorption wave range of at least about 360–450 nm.

Absorption maximum of said ultraviolet absorber is less than absorption maximum of said photo-initiator. Further, difference between absorption maximum of said ultraviolet absorber and absorption maximum of said photo-initiator is usually 5–200 nm, preferably 10–180 nm, more preferably 20–150 nm, most preferably 50–100 nm.

In the ultraviolet-curable thermochromic ink composition of the invention, basic components comprising thermochromic microcapsules and a photo-polymerizable composition are known. Therefore, each of basic components is not specifically limited to.

I. Thermochromic Microcapsules

The thermochromic microcapsules of the invention comprises microcapsules, and thermochromic material and ultraviolet absorber encapsulated therein. The thermochromic material comprises at least one electron-donating and coloring organic compound, at least one electron-accepting compound and at least one desensitizer.

A proportion of each component is not specifically limited to, but usually about 0.1–10 parts (preferably about 1–10 parts) of electron-donating and coloring organic compound and about 0.1–40 parts (preferably about 1–20 parts) of electron-accepting compound based on 100 parts of desensitizer.

I-a. Electron-donating and Coloring Organic Compounds

Electron-donating and coloring organic compounds include the following compounds (i) to (vii).

(i) Fluorans, such as 2'-((2-chlorophenyl)amino)-6'-(dibutylamino)-spiro(isobenzofuran-1( 3H),9'(9H)xanthene)-3-on; 3-diethylamino-6-methyl-7-chlorofluoran; 3-diethylaminobenzo(a)-fluoran; 3,6-diphenylaminofluoran; 3-amino-5-methylfluoran; 2-methyl-3-amino-6,7-dimethylfluoran; 2-bromo-6-cyclohexylaminofluoran; 6'-(ethyl( 4-methylphenyl)amino)-2'-(N-methylphenylamino)-spiro(isobenzofuran- 1(3H),9'(9H)xanthene)-3-on, etc.

(ii) Diarylphthalides, such as Crystal violet lactone, Malachite green lacton, etc.

(iii) Polyarylcarbinols, such as Michler's hydrol, Crystal violet carbinol, Malachite green carbinol, etc.

(iv) Leuco auramines, such as N-(2,3-dichlorophenyl)leuco auramine, N-benzoylauramine, N-acetylauramine, etc.

(v) Rhodamine beta lactams, such as Rhodamine beta lactam, etc.

(vi) Indolines, such as 2-(phenyliminoethylidene)-3,3-dimethylindoline, etc.

(vii) Spiropyranes, such as N-3,3-trimethylindolinobenzospiropyrane; 8-methoxy-N-3,3-trimethylindolinobenzospiropyrane, etc.

Fluorans are most preferable as electron-donating and coloring organic compounds.

I-b. Electron-accepting Compounds

Electron-accepting compounds include the following compounds (i) to (ix).

(i) Phenols, such as bisphenol A, p-phenylphenol, dodecylphenol, o-bromophenol, ethyl p-oxybenzoate, methyl gallate, phenol resin, etc.

(ii) Metal phenolates, such as Na, K, Li, Ca, Zn, Al, Mg, Ni, Co, Sn, Cu, Fe, Ti, Pb, Mo and like metal salts of phenol.

(iii) Aromatic carboxylic acids and $C_2$–$C_5$ aliphatic carboxylic acids, such as phthalic acid, benzoic acid, acetic acid, propionic acid, etc.

(iv) Metal carboxylates, such as sodium oleate, zinc salicylate, nickel benzoate, etc.

(v) Acidic phosphate esters and metal salts thereof, such as butyl acid phosphate, 2-ethylhexyl acid phosphate, dodecyl acid phosphate, di-O-tolyl phosphate, and Na, K, Li, Ca, Zn, Al, Mg, Ni, Co, Sn, Fe, Ti, Pb, Mo and like metal salts of said esters.

(vi) Triazole compounds, such as 1,2,3-triazole, 1,2,3-benzotriazole, etc.

(vii) Thiourea and derivatives thereof, such as diphenylthiourea, di-o-toluylurea, etc.

(viii) Halohydrines, such as 2,2,2-trichloroethanol; 1,1,1-tribromo-2-methyl-2-propanol; N-3-pyridyl-N'-(1-hydroxy- 2,2,2-trichloroethyl)urea; etc.

(ix) Benzothiazoles, such as 2-mercaptobenzothiazole, 2-( 4'-morpholinodithio)benzothiazole, N-tert-butyl-2-benzothiazolyl sulpheneamide, 2-mercaptobenzothiazole zinc salt, etc.

Phenols are most preferable as electron-accepting compounds.

I-c. Desensitizers

Desensitizers include the following compounds (i) to (xiv).
(i) Alcohols, such as n-cetyl alcohol, n-octyl alcohol, cyclohexyl alcohol, hexyleneglycol, etc.
(ii) Esters, such as myristate esters, laurate esters, dioctyl phthalate, etc.
(iii) Ketones, such as methylhexylketone, benzophenone, stearone, etc.
(iv) ethers, such as butyl ether, diphenyl ether, distearyl ether, etc.
(v) Acid amides, such as oleic acid amides, stearamide, N-octyl-lauramide, capronanilide, etc.
(vi) Fatty acids having at least 6 carbon atoms, such as lauric acid, stearic acid, 2-oxymyristic acid, etc.
(vii) Aromatic compounds, such as diphenylmethane, dibenzyltoluene, propyldiphenyl, isopropylnaphthalene, 1,1,3-trimethyl-3-tolylindan, dodecylbenzene, etc.
(viii) Thiols, such as n-decyl mercaptane, n-myristyl mercaptane, n-stearyl mercaptane, isocetyl mercaptane, dodecylbenzyl mercaptane, etc.
(ix) Sulfides, such as di-n-octylsulfide, di-n-decylsulfide, diphenylsulfide, diethylphenylsulfide, dilauryldithiopropionate, etc.
(x) Disulfides, such as di-n-octyl disulfide, di-n-decyl disulfide, diphenyl disulfide, dinaphthyl disulfide, etc.
(xi) Sulfoxides, such as diethylsulfoxide, tetramethylenesulfoxide, diphenylsulfoxide, etc.
(xii) Sulfones, such as diethylsulfone, dibutylsulfone, diphenylsulfone, dibenzylsulfone, etc.
(xiii) Azomethines, such as benzylidene laurylamine, p-methoxybenzylidene laurylamine, benzylidene p-anisidine, etc.
(xiv) Fatty acid primary amines, such as oleic acid stearylamine, stearic acid myristylamine, behenic acid stearylamine, etc.

Alcohols and esters are most preferable as desensitizers.

I-d. Ultraviolet Absorbers

According to the invention, ultraviolet absorber included in thermochromic microcapsules has an absorption wave range of at least about 220–380 nm. The ultraviolet absorber is usually blended in a proportion of about 1–40 parts (more preferably about 5–20 parts) based on 100 parts of desensitizer.

Examples of such ultraviolet absorber are (i) to (iii) shown below.
(i) Benzotriazoles, such as 2-(3-t-butyl-5-methyl-2-hydroxyphenyl)- 5-chlorobenzotriazole; 2-(3,5-di-t-amyl-2hydroxyphenyl)benzotriazole; 2-(5-methyl-2-hydroxyphenyl)benzotriazole; 2-(2'-hydroxy-5'-t-octylphenylbenzotriazole; etc.
(ii) Benzophenones, such as 2,4-dihydroxybenzophenone, 2-hydroxy- 4-n-dodecyloxybenzophenone, 2-hydroxy-4-methoxybenzophenone, etc.
(iii) Cyanoacrylates, such as 2-ethylhexyl-2-cyano-3,3'-diphenylacrylate, ethyl-2-cyano-3,3'-diphenylacrylate, etc.

Benzotriazoles are most preferable as desensitizers.

I-e. A Method for Producing Thermochromic Microcapsules

Thermochromic microcapsules are not specifically limited to, but produced by conventional methods, such as in-situ method, interfacial polymerization method, coacervation method, etc. Material, size and membrane thickness of microcapsules are not specifically limited to, but include gelatine-gum arabic, urea resin, melamine resin, urethane resin and epoxy resin as material thereof, about 1–50 μm in diameter as size thereof and several angstrom to about 1 μm as membrane thickness thereof.

II. Photo-polymerizable Resin Composition

The photo-polymerizable resin composition employed according to the invention is prepared by blending photo-initiator having a specific absorption wave range (at least about 360–450 nm) with a known photo-polymerizable composition comprising photo-polymerizable prepolymer and photo-polymerizable monomer as viscosity modifier.

In the photo-polymerizable resin composition of the invention, about 10–300 parts (preferably about 50–200 parts) of photo-polymerizable monomer and about 0.01–50 parts (preferably about 0.1–20 parts) of said photo-initiator are blended with 100 parts of photo-polymerizable prepolymer.

When an amount of photo-polymerizable monomer is too small, viscosity of ink become excessively high resulting in decrease of printability. In contrast, excessive amount of photo-polymerizable monomer causes decrease of curability of ink film resulting in insufficient film strength. When an amount of photo-initiator is too small, cure become insufficient. In contrast, excessive amount of photo-initiator causes rapid cure of film surface resulting in decrease of internal curing characteristics.

The photo-polymerizable resin composition may be prepared by homogeneously agitating and mixing photo-polymerizable prepolymer, photo-initiator and photo-polymerizable monomer optionally heated at about 80 ° C. or less.

Each component of photo-polymerizable resin composition is described below in detail.

II-a. Photo-polymerizable Prepolymer

A prepolymer being capable of forming film by photo-polymerization in the presence of photo-initiator is employed as photo-polymerizable prepolymer. Viscosity at 20° C. of photo-polymerizable prepolymer preferably ranges about 500–500,000 cps. Examples of said photo-polymerizable prepolymer are not specifically limited to, but include the following (i) to (v).
(i) Polyester acrylates prepared by introducing acryloyl groups into oils, modified alkyd, modified polyester, etc., followd by forming urethane.
(ii) Epoxy acrylates, such as epoxydated drying oil acrylate, bisphenol A diglycidyl acrylate, modified bisphenol A epoxy acrylate, novolak-type epoxy acrylate, aliphatic-type epoxy acrylate, etc.
(iii) Polyurethane acrylates, such as polycarbonate acrylate, hydroxyl group-containing acrylate, reaction product (alkyd, drying oil, polyester, etc.) between diisocyanate and hydroxyl group-containing compounds, etc.
(iv) Polyol acrylates, such as pentaerythritol acrylate, pentaerythritol tetraacrylate, dipentaerythritol hexaacrylate, ditrimethylolpropane tetraacrylate, etc.
(v) Others, such as polyether acrylate, melamine acrylate, etc.

II-b. Photo-polymerizable Monomers

Photo-polymerizable monomers are prepared by diluting photo-polymerizable prepolymers, followed by adjusting viscosity of the diluent. Examples of photo-polymerizable monomers are (i) to (iii) shown below.
(i) Mono-functional monomers, such as 2-ethylhexyl acrylate, tetrahydrofurfuryl acrylate, etc.
(ii) Bi-functional monomers, such as 1,6-hexanediol diacrylate, diethyleneglycol diacrylate, tripropyleneglycol diacrylate, neopentylglycol diacrylate, 2,2-bis(4-(acryloyloxydiethoxyphenyl))propane, reaction product of neopentylglycol and hydroxypivalic acid, N-vinylpyrrolidone, etc.

(iii) Poly-functional monomers, such as trimethylolpropane triacrylate, pentaerythritol triacrylate, etc.

II-c. Photo-initiators

Photo-initiators employed have an absorption wave range of at least about 360–450 nm. Examples of such photo-initiators are (i) and (ii) shown below.

(i) Thioxanthones, such as thioxanthone, 2-chlorothioxanthone, 2,4-diethylthioxanthone, isopropylthioxanthone, 1-chloro-4-propoxythioxanthone, etc.

(ii) Others, such as 2-methyl-1-(4-(methylthio)phenyl)-2-morpholinopropannone- 1; 2,4,6-trimethylbenzoyldipbenylphosphineoxide, etc.

III. Production of Ultraviolet-curable Thermochromic Ink Composition

The ultra violet curable thermochromic ink composition of the invention may be prepared by adding previously obtained thermochromic microcapsules to said photo-polymerizable resin composition, followed by dispersing microcapsules.

The ink composition of the invention is optionally blended with known additives employed in the relevant field. Acetophenone, benzophenone and like known photo-initiators may be blended so as to improve surface curing characteristics of ink film. Known sensitizers including N-methyldiethanolamine and 4-dimethylaminoethylbenzoate may be blended in the same purpose.

In order to further improve printability of ink, silicones and like known anti-foaming agent and/or leveling agent (about 0.01–0.5% of total weight of ink) may be blended.

Known polymerization inhibitors such as hydroquinone, methoquinone, etc., may be blended in an amount of about 100–2,000 ppm based on the total weight of ink so as to prevent polymerization of said photo-polymerizable resin composition while stored.

Conventionally employed color pigment in printing ink may be blended for varying degree of discoloration.

The ultraviolet-curable thermochromic ink composition of the invention may be applicable to a variety of print such as picture book, poster, seal, label, packing paper, etc., according to conventional printing methods, such as silk screen printing, offset printing, gravure printing and so on. The ultraviolet-curable thermochromic ink composition may be employed as record-forming material on a base by the use of discoloring characteristics depending on temperature.

Because a photo-initiator having an absorption wave range (at least about 360–450 nm) higher than absorption wave range (at least about 220–380 nm) of ultraviolet absorber is added, the ultraviolet-curable thermochromic ink composition is free of undercure and excellent in resistance to light and curing characteristics.

PREFERRED EMBODIMENTS FOR CARRYING OUT THE INVENTION

Examples, comparative examples and reference examples are given below to illustrate the present invention in greater detail.

REFERENCE EXAMPLE 1

Thermochromic microcapsules were prepared by using each material as shown in table 1. In table 1, symbols of electron-donating and coloring organic compounds ("Donor" in table 1), ultraviolet absorber and encapsulation method are shown below. An amount of each component blended is represented as "part by weight". Further, electron accepting compound is referred to as "Acceptor" in table 1.

TABLE 1

| Microcapsule | Donor | Acceptor | Desensitizer | UV absorber | Encapsulation method |
|---|---|---|---|---|---|
| No. 1 | (A) 6 | Bisphenol A 12 | Cetyl alcohol 100 | (UV-2) 12 | (a) |
| No. 2 (comparative) | (A) 6 | Bisphenol A 12 | Cetyl alcohol 100 | (UV-5) 10 | (a) |
| No. 3 | (F) 6 | Bisphenol A 12 | Stearyl 60 alcohol Stearyl 40 palmitate | (UV-2) 10 | (a) |
| No. 4 | (C) 6 | 1,2,3-Triazole 12 | Stearic acid 100 | (UV-1) 12 | (c) |
| No. 5 | (B) 4 | Zinc salicylate 8 | Cetyl alcohol 100 | (UV-4) 15 | (b) |
| No. 6 | (D) 3.5 | Diphenyl thiourea 10.5 | Lauryl palmitate 100 | (UV-2) 12 | (d) |
| No. 7 | (E) 4.5 | p-Phenyl phenol 9 | 4,4'-distearyl diphenyl amine 100 | (UV-3) 8 | (e) |

1) Electron-donating and coloring organic compounds ("Donor" in table 1)

(A) 2'-((2-chlorophenyl)amino)-6'-(dibutylamino)-spiro(isobenzofuran-1(3H),9'(9H)xanthene)-3-on;

(B) 1',3-(disubstituted)-6,7-(disubstitutedamino)-spiro(isobenzofuran-1(3H),9'-(9H)xanthene)3-on;

(C) 3,6-diphenylaminofluoran;

(D) 6'-(ethyl(4-methylphenyl)amino)-2'-(N-methylphenylamino)-spiro(isobenzofuran-1(3H),9'-( 9H)xanthene)-3-on;

(E) 3-diethylamino-6-methyl-7-chlorofluoran;

(F) 3-diethylaminobenzo(a)-fluoran;

2) Ultraviolet absorber (UV-1 to UV-4 have an absorption wave range of at least 220–380 nm; and UV-5 has an absorption wave range of at least 350–450 nm.)

(UV-1) 2-(3,5-di-t-amyl-2-hydroxyphenyl)benzotriazole;

(UV-2) 2-(3-t-butyl-5-methyl-2-hydroxyphenyl)-5-chlorobenzotriazole;

(UV-3) 2-(2'-hydroxy-5'-octylphenyl)benzotriazole (UV-4) 2-(5-methyl-2-hydroxyphenyl)benzotriazole (UV-5) 1-(2-(3(3,5-di-t-butyl-4-hydroxyphenyl)propionyloxy)ethyl)- 4-(3-(3,5-di-t-butyl-4-hydroxyphenyl)propionyloxy)- 2,2,6,6-tetramethylpiperidine.

3) Encapsulation methods

In the encapsulation methods shown below, "thermochromic composition" corresponds to a composition comprising electron-donating and coloring organic compound, electron accepting compound, desensitizer and ultraviolet absorber in a proportion as shown in table 1.

(a) In-situ method (1)

A 90 g of thermochromic composition was dissolved at 80° C., and the solution was added dropwise to 100 g of 5% aqueous solution of ethylene-maleic anhydride copolymer (trademark "EMA-31", MONSANT Co., LTD.). The resulting mixture was stirred to form micro-droplets and adjusted at a pH of 4.5 with 20% NaOH aqueous solution to give an aqueous suspension. A solution prepared by dissolving 4 g of melamine in 10 g of 37% formaldehyde aqueous solution at 70° C. was gradually added to said suspension under stirring and the mixture was stirred continuously for 2 hours to obtain suspension of melamine resin microcapsules encapsulating thermochromic composition. Said suspension was centrifuged, and then separated material was dried to give microcapsules having an average particle diameter of 5 μm.

(b) In-situ method (2)

A 90 g of thermochromic composition was dissolved at 80° C., and the solution was added dropwise to 100 g of 5% aqueous solution of sodium polystyrenesulfonate (molecular weight=about 50,000). The resulting mixture was stirred to form micro-droplets and adjusted at a pH of 3.0 with acetic acid to give an aqueous suspension. A solution prepared by dissolving 6 g of urea and 1 g of resorcin in 15 g of 37% formaldehyde aqueous solution was gradually added to said suspension under stirring and the mixture was stirred continuously for 2 hours at 70° C. to obtain suspension of urea resin microcapsules encapsulating thermochromic composition. Said suspension was centrifuged, and then separated material was dried to give microcapsules having an average particle diameter of 3 μm.

(c) Interfacial polymerization method (1)

A mixture of 5 g of epoxy resin (trademark "EPICOAT 828", Shell Chemical Co., Ltd.) and 80 g of thermochromic composition was dissolved at 80° C. The solution was added dropwise to 160 g of 5% aqueous solution of gelatine. An aqueous suspension was obtained by stirring the resulting mixture to form micro-droplets. A solution prepared by dissolving 3 g of curing agent for epoxy resin (trademark "EPICURE U", Shell Chemical Co., Ltd.; amine adduct of epoxy resin) in 6 g of water was gradually added to said aqueous suspension under stirring and the mixture was stirred continuously at 80° C. for 4 hours to obtain suspension of epoxy resin microcapsules encapsulating thermochromic composition. Said suspension was centrifuged, and then separated material was dried to give microcapsules having an average particle diameter of 10 μm.

(d) Interfacial polymerization method (2)

A mixture of 3 g of polyisocyanate (trademark "SUMIJULE N-75", SUMITOMO CHEMICAL CO., LTD.) and 80 g of thermochromic composition was dissolved at 80° C. The solution was added dropwise to 160 g of 5% aqueous solution of polyvinylalcohol. An aqueous suspension was obtained by stirring the resulting mixture to form micro-droplets. A 6 g of curing agent (trademark "EPICURE U", Shell Chemical Co., Ltd.; amine adduct of epoxy resin) was gradually added to said aqueous suspension under stirring and the mixture was stirred continuously for 5 hours at 65° C. to obtain suspension of urea resin microcapsules encapsulating thermochromic composition. Said suspension was centrifuged, and then separated material was dried to give microcapsules having an average particle diameter of 18 μm.

(e) Coacervation method

A 50 g of thermochromic composition previously heated and dissolved at 80° C. was added dropwise to 100 g of 5% aqueous gelatine solution heated until 50° C. An aqueous suspension was obtained by stirring the resulting mixture to form micro-droplets. Subsequently 100 g of 5% aqueous gum arabic solution was added to the aqueous suspension and the mixture was adjusted at a pH of 4.5 with 1% hydrochloric acid solution. Addition of 200 g of water to the resulting mixture caused coacervation. The mixture was cooled to 10° C. A 1 g of aqueous solution of 37% formaldehyde was added thereto, and the mixture was adjusted at a pH of 9 with 20% NaOH aqueous solution. A suspension of gelatine microcapsules encapsulating thermochromic composition was obtained by stirring the mixture at normal temperature for 4 hours. Said suspension was centrifuged, and then separated material was dried to give microcapsules having an average particle diameter of 20 μm.

EXAMPLES 1–7 AND COMPARATIVE EXAMPLES 1–3

Photo-initiator ("Initiator" in table 2), photo-porimerizable prepolymer ("Prepolymer" in table 2) and photo-polymerizable monomer ("Monomer" in table 2) and other additives were mixed in a proportion (weight ratio) shown in table 2 and heated to 70° C., and stirred homogeneously. An ultraviolet-curable thermochromic ink composition was obtained by adding said microcapsules to the mixture to form a suspension.

In table 2, symbols of "Initiator", "Prepolymer" and "Monomer" are shown below.

TABLE 2

| | Microcapsule | Initiator | Prepolymer | Monomer | Additive |
|---|---|---|---|---|---|
| Example | | | | | |
| 1 | No. 1 25 | (A) 1 | (i) 40 | (a) 30 | — |
| 2 | No. 3 25 | (B) 1 | (ii) 20 (ii) 20 | (b) 20 | — |
| 3 | No. 4 25 | (A) 1 | (v) 50 | (c) 40 (d) 20 | sensitizer 2 |
| 4 | No. 5 25 | (C) 0.1 (E) 3 | (vi) 40 | (c) 30 (d) 10 | — |
| 5 | No. 6 25 | (D) 1 (E) 2 | (vii) 40 | (b) 30 | — |
| 6 | No. 7 25 | (D) 2 | (iv) 30 | (b) 30 | sensitizer 4 |
| 7 | No. 3 25 | (D) 1 (E) 2 | (vii) 40 | (b) 30 | pigment 3 |
| Comparative Example | | | | | |
| 1 | No. 1 25 | Benzophenone 3 | (i) 40 | (a) 30 | — |
| 2 | No. 1 25 | (F) 3 | (i) 40 | (a) 30 | sensitizer 6 |
| 3 | No. 2 25 | Benzophenone 3 | (i) 40 | (a) 30 | — |

1) Photo-initiator (Initiator in table 2)

(A) 2,4-diethylthioxanthone;

(B) 2-chloro-thioxanthone;

(C) 2-methyl-1-(4-(methylthio)phenyl)-2-

(D) 2,4,6-trimethylbenzoyldiphenyl-phosphineoxide;

(E) benzyldimethylketal;

(F) 2-hydroxy-2-methyl-1-phenyl-1-on;

2) Photo-polymerizable prepolymer (Prepolymer in table 2)

(i) Aromatic urethane acrylate (trademark "ARONIX M-1100" TOAGOSEI, Co., Ltd.; voscosity=200,000± 30,000 cps at 20° C.);

(ii) Polyfunctional polyester acrylate (trademark "ARONIX M-7100" TOAGOSEI, Co., Ltd.; voscosity=80,000± 12,000 cps at 20° C.);

(iii) Bifunctional polyester acrylate (trademark "ARONIX M-6200" TOAGOSEI Co., Ltd.; voscosity= 2,500±500 cps at 20° C.);

(iv) Bisphenol A epoxy diacrylate (trademark "PHOTOMER 3016" SAN NOPCO, Ltd.; viscosity=7,000–100,000 cps at 20 ° C.);

(v) Urethane acrylate (trademark "KAYARAD UX4101" NIPPON KAYAKU, CO., Ltd.; weight-average molecular weight= 6,700±600; viscosity=400,000±20,000 cps at 20° C.);

(vi) Urethane acrylate (trademark "KAYARAD UX6101" NIPPON KAYAKU, CO., Ltd.; weight-average molecular weight= 6,900±700; viscosity=330,000±12,000 cps at 20° C.);

(vii) Urethane acrylate (trademark "KAYARAD UX8101" NIPPON KAYAKU, CO., Ltd.; weight-average molecular weight= 3,400±300; viscosity=200,000±8,000cps at 20° C.);

3) Photo-polymerizable monomers (Monomer in table 2)

(a) neopentylglycol diacrylate;

(b) 1,6-hexanediol diacrylate;

(c) reaction product of neopentylglycol and hydroxypivalic acid (trademark "KAYARAD MANDA" NIPPON KAYAKU, CO., Ltd.; weight-average molecular weight= 312);

(d) 2,2-bis(4-(acryloyloxydiethoxyphenyl))-propane (trademark "KAYARAD R-551" NIPPON KAYAKU, CO., Ltd.; weight-average molecular weight=512);

4) Other additives (Additive in table 2)

Sensitizer: N-methyldiethanolamine

Pigment: Cyanine Blue 4938 (DAINICHISEIKA COLOR & CHEMICAL MFG. Co., Ltd.)

Cured films of ink were obtained by printing on white PET film in thickness of 30 μm, using each ink composition mentioned above and screen mesh (120 mesh, made of Tetoron), followed by irradiation of ultra violet ray with high-pressure mercury vapor lamp in irradiation distance of 10 cm and conveyor speed of 10 m/min..

Ink films obtained were subjected to the following tests.

I. Curability Test

Test 1 was carried out by scratching the surface of cured film with nail, followed by observing the surface with naked eye.

Test 2 was carried out by applying adhesive tape to the surface of cured film, followed by stripping the tape in a vertical direction and observing the surface with naked eye.

Criteria of the tests are shown below.

"o": Ink surface is not damaged by test 1 and film is not stripped by test 2.

"x": Ink surface is damaged by test 1 and/or film is stripped by test 2.

II. Light-resistance Test

Color development or discoloration of cured film was observed with naked eye after light exposure with fadeometer (corresponding to fourth class of blue scale)

Criteria of the test are shown below.

"o": Color and reversible susceptibility to discoloration at a predetermined temperature are substantially maintained before and after the test, and color difference ΔE before and after the test is 10 or less.

"x": Discoloration after the test is enormous, reversible susceptibility to discoloration is lost and color difference ΔE before and after the test is 30 or more.

The results of curability tests and light-resistance test are shown in table 3

TABLE 3

| Ink composition | Color change and Temperature | Curability | Light resistance |
|---|---|---|---|
| Ex. 1 | Black-Colorless 40° C. | o | o |
| Ex. 2 | Red-Colorless 46° C. | o | o |
| Ex. 3 | Blue-Colorless 58° C. | o | o |
| Ex. 4 | Orange-Colorless 40° C. | o | o |
| Ex. 5 | Green-Colorless 32° C. | o | o |
| Ex. 6 | Vermilion-Colorless 75° C. | o | o |
| Ex. 7 | Purple-Blue 46° C. | o | o |
| Comp. Ex. 1 | Black-Colorless 40° C. | x | o |
| Comp. Ex. 2 | Black-Colorless 40° C. | x | o |
| Comp. Ex. 3 | Black-Colorless 40° C. | o | x |

As shown in table 3, the ultraviolet-curable thermochromic ink composition of the invention comprising at least one photo-initiator having an absorption wave range of at least 360–450 nm is excellent in curability and light resistance.

In contrast, the ink compositions of comparative examples 1 and 2 without such photo-initiator is inferior in curability. Further, the ink compositions of comparative examples 3 containing photo-initiator having an absorption wave range of at least 360–450 nm in microcapsules is inferior in light resistance.

What we claim are:

1. An ultraviolet-curable thermochromic ink composition comprising thermochromic microcapsules and a photo-polymerizable composition as basic components, wherein said thermochromic microcapsule comprises at least one ultraviolet absorber having an absorption wave range of at least about 220–380 nm, and said photo-polymerizable composition comprises at least one photo-initiator having an absorption wave range of at least about 360–450 nm.

2. The ultraviolet-curable thermochromic ink composition as defined in claim 1 wherein said ultraviolet absorber comprises at least one of benzotriazoles selected from the group consisting of 2-( 3-t-butyl-5-methyl-2-hydroxyphenyl)-5-chlorobenzotriazole, 2-(3,5-di-t-amyl-2-hydroxyphenyl)benzotriazole, 2-(5-methyl-2-hydroxyphenyl)benzotriazole and 2-(2'-hydroxy-5'-t-octylphenylbenzotriazole.

3. The ultraviolet-curable thermochromic ink composition as defined in claim 1 wherein said photo-initiator comprises at least one selected from the group consisting of thioxanthone, 2-chlorothioxanthone, 2,4-diethylthioxanthone, isopropylthioxanthone and 1-chloro-4-propoxythioxanthone; 2-methyl- 1-(4-methylthio)phenyl)-2-morpholinopropanone-1; and 2,4,6-trimethylbenzoyldiphenyl-phosphineoxide.

* * * * *